United States Patent [19]

Olson

[11] 4,401,273
[45] Aug. 30, 1983

[54] TWO-PIECE LOW VOLUME SPRAY DEVICE

[76] Inventor: Donald O. Olson, 5885 Dartmouth St., Chula Vista, Calif. 92010

[21] Appl. No.: 243,723

[22] Filed: Mar. 16, 1981

[51] Int. Cl.³ .............................................. B05B 1/26
[52] U.S. Cl. .................................... 239/498; 239/543
[58] Field of Search ............. 239/498, 524, 527, 542, 239/547, 271, 204, 460, 537

[56] References Cited
U.S. PATENT DOCUMENTS

| 3,753,527 | 8/1973 | Galbraith et al. | 239/547 |
| 3,815,831 | 6/1974 | Jooste | 239/547 |
| 4,199,105 | 4/1980 | Olson et al. | 239/498 |

Primary Examiner—James B. Marbert
Attorney, Agent, or Firm—Owen, Wickersham & Erickson

[57] ABSTRACT

A low volume spray device for an irrigation system comprises upper and lower separately molded plastic members that are assembled before being installed on a fluid conduit. The two piece construction allows the upper or head member to be molded with a deflector portion having an exterior shape capable of forming a uniform spray pattern. The upper head member also has a lower tubular portion adapted to extend into the fluid conduit as well as around the lower member so that fluid pressure cannot act to separate the two members when in use.

9 Claims, 18 Drawing Figures

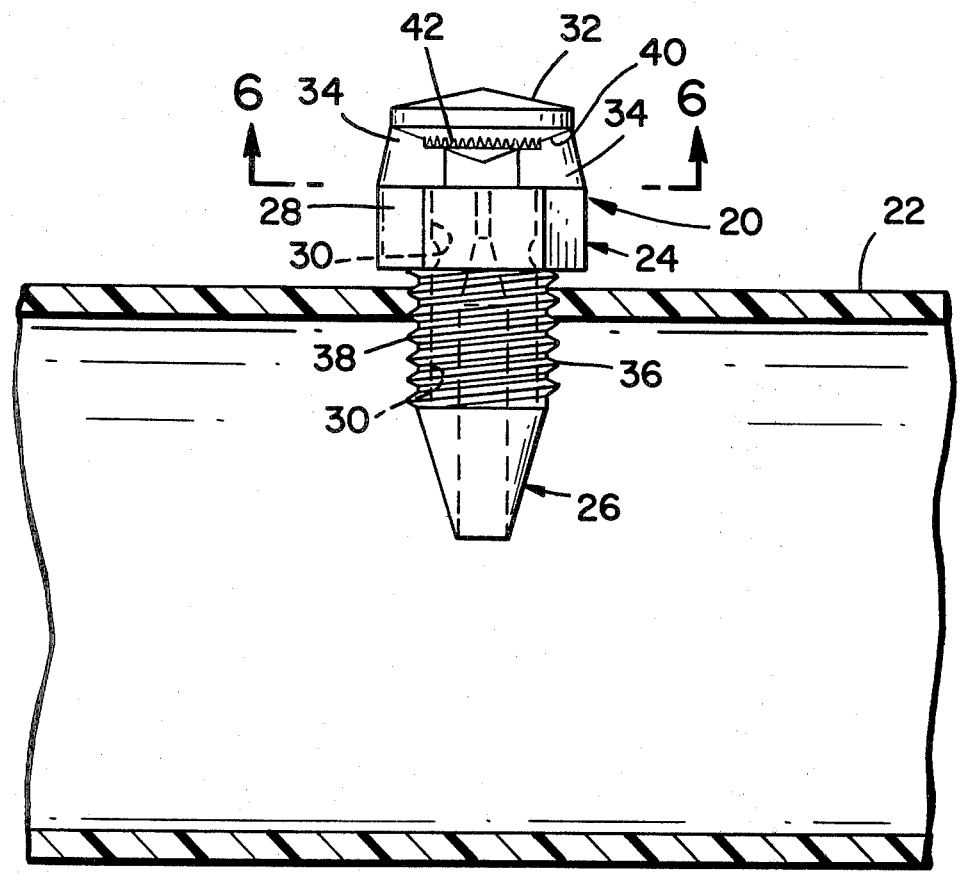
FIG_1

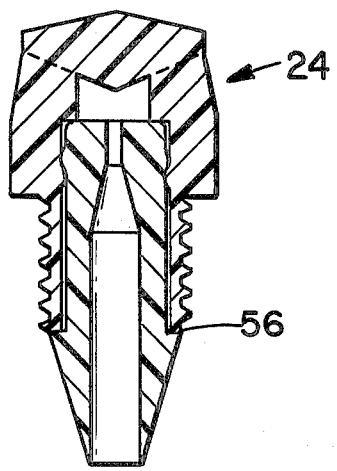
FIG_2
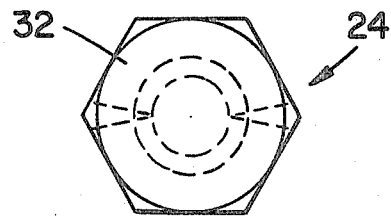
FIG_4
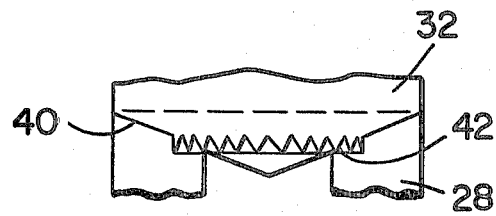
FIG_5
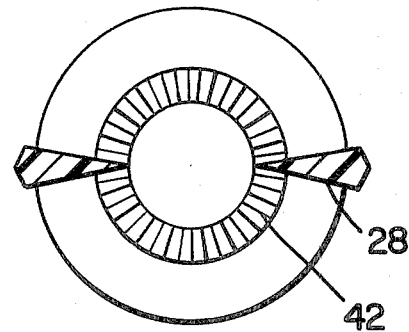
FIG_6
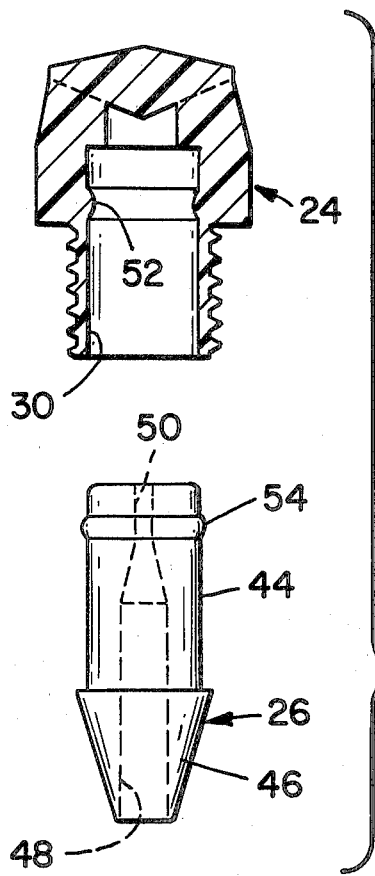
FIG_3

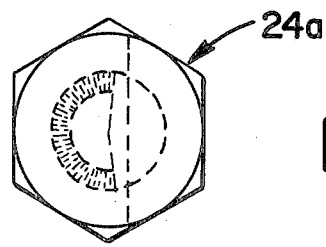
FIG_8
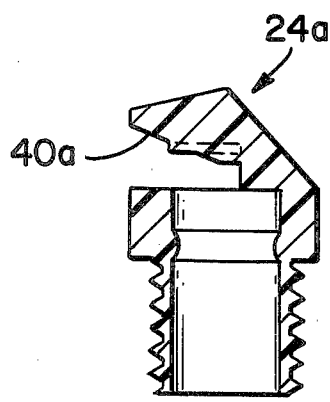
FIG_7
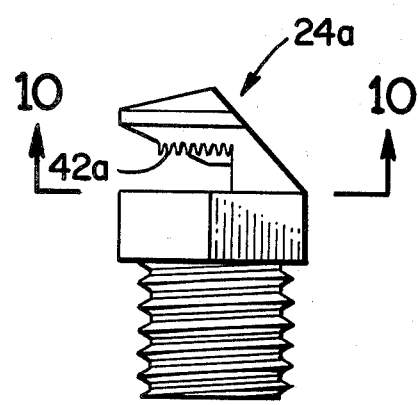
FIG_9
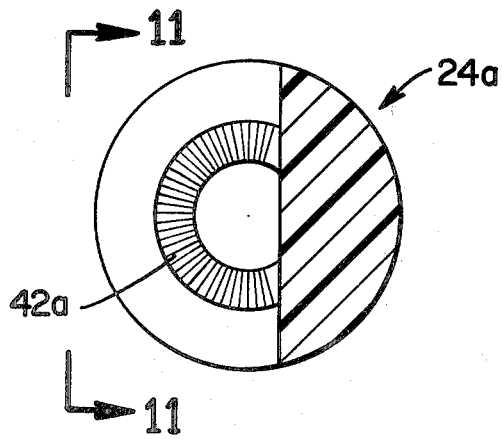
FIG_10
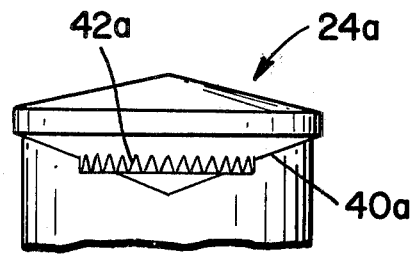
FIG_11

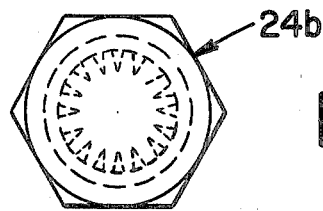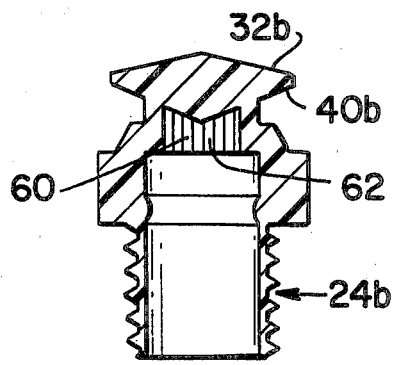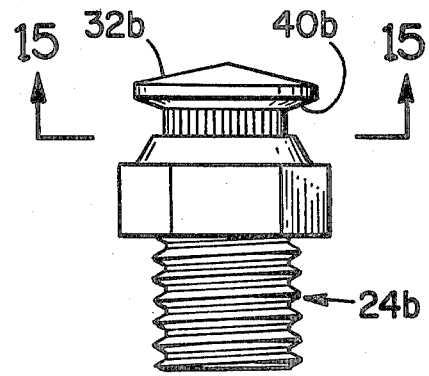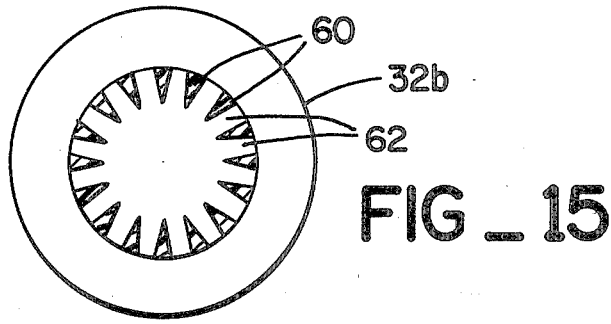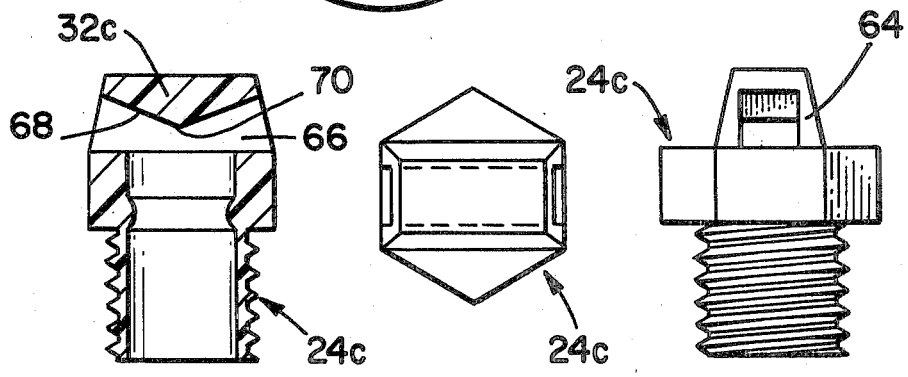

TWO-PIECE LOW VOLUME SPRAY DEVICE

BACKGROUND OF THE INVENTION

This invention relates to an improved low volume spray or sprinkler device for surface irrigation systems and more particularly to such a device that is readily made in two separate pieces, will produce a uniform spray pattern, and will not separate inadvertently due to fluid pressure when installed in a surface conduit.

In the prior art, a spray device, as shown in U.S. Pat. No. 3,815,831, was comprised of two separately molded plastic members including an upper member with a conical deflector and a lower member that was adapted for insertion in a plastic hose or conduit. The upper member or cap was attached to the lower member by means of a peripheral ridge on its lower edge that fit into a groove on the upper end of the lower member above the conduit. This arrangement created a serious problem in that the cap, constantly subjected to fluid pressure from the conduit, often was blown off due to a failure in gripping power by its peripheral ridge. This rendered the spray device inoperative and required replacement of the device. Since a typical surface irrigation system often required many hundreds or thousands of such spray devices, the possibility of such "blow-offs" and their inherent unreliability was intolerable.

A one piece spray device was developed as shown in my U.S. Pat. No. 4,199,105 which alleviated the cap separation problem. However, in order to mold the device as a single unit, it was not possible to provide a conical deflector with relatively long radially extending grooves to control the spray pattern. Instead, the aforesaid device utilized a conical deflector with spaced apart notches along its periphery. These notches provided a spray pattern that was entirely satisfactory for some applications but not as satisfactory as a pattern produced by radial grooves which was required for many other irrigation applications.

It is therefore a general object of the invention to provide an improved low volume spray device for surfact type irrigation systems.

Another object of the invention is to provide a low volume spray device for an irrigation system that can be molded as two plastic members including an upper member having a conical deflector with radial spray controlling grooves and which is connectable to a lower member in such a manner that it cannot be separated therefrom by fluid pressure in the system.

Yet another object of the invention is to provide a low volume spray or sprinkler device that can be readily configured to provide a spray pattern over some predetermined area of less than the full 360° around the device.

BRIEF SUMMARY OF THE INVENTION

A low volume spray device according to the principles of the present invention comprises a pair of upper and lower elements which when assembled together can be readily inserted into a sidewall of a flexible conduit forming part of a surface type irrigation system. The upper element has a sleeve-like body with a series of external threads at its lower end that extend below an enlarged flat sided head portion. Attached to and extending above the head portion is a pair of spaced apart posts that support a fixed fluid deflection member having a series of radially extending grooves on its bottom conical face. The lower element of the device comprises a tubular body with a central passage that extends into and is retained within the sleeve-like body and head portion of the upper member. The lower end of the tubular body is beveled to facilitate its insertion into the flexible conduit or hose and it has a central passage with a constriction near its upper end through which water can flow. The central passage and thus the upward stream of water through it, is aligned with the center of the conical deflector. As water strikes the deflector, its radial grooves break up the stream into a uniform spray pattern as it leaves the periphery of the deflector. Since the sleeve portion of the upper body member is threadedly engaged with the wall of the conduit, the spray device is held firmly in place and there is no tendency or possibility of the two members separating inadvertently after installation. Though the exterior shape of both members is relatively complex, including the essential pattern of grooves on the deflector, they are both readily adaptable for ease and economy of manufacture using conventional plastic molding techniques.

Other objects, advantages and features of the invention will become apparent from the following detailed description of one embodiment thereof presented in conjunction with the acompanying drawing.

BRIEF DESCRIPTION OF THE DRAWING

FIG. 1 is a view in elevation of a sprinkler device according to the present invention as it appears when installed in a plastic conduit;

FIG. 2 is a view in elevation and in section of the device of FIG. 1;

FIG. 3 is an exploded view of the device of FIG. 1, showing its upper member in section;

FIG. 4 is a top view of the device of FIG. 1;

FIG. 5 is an enlarged fragmentary view in section showing the deflector portion of the device in FIG. 1;

FIG. 6 is a view in section taken along line 6—6 of FIG. 1;

FIG. 7 is a view in elevation and in section of the upper member for a modified form of sprinkler device according to the invention;

FIG. 8 is a top view of the device of FIG. 8;

FIG. 9 is a view in elevation of the device of FIG. 7;

FIG. 10 is an enlarged view in section taken at line 10—10 of FIG. 9;

FIG. 11 is a fragmentary view in section taken at line 11—11 of FIG. 10;

FIG. 12 is a view in elevation and in section of another modified form of an upper member for a sprinkler device according to the invention;

FIG. 13 is a top view of the device of FIG. 12;

FIG. 14 is a view in side elevation of the device of FIG. 14;

FIG. 15 is an enlarged view in section taken at line 15—15 of FIG. 14;

FIG. 16 is a view in elevation and in section of another form of upper member for sprinkler device of the present invention;

FIG. 17 is a top view of the device of FIG. 16; and

FIG. 18 is a view in side elevation of the device of FIG. 16 but rotated 90°.

DETAILED DESCRIPTION OF EMBODIMENT

With reference to the drawing, FIG. 1 shows a spray or sprinkler device 20 as it appears when installed in a flexible plastic hose or conduit 22 of a typical surface type irrigation system. In such a system, water is supplied at a constant pressure to the conduit and is forced through the device to produce a desired spray pattern adjacent a tree or plant being irrigated. The spray devices are quite small and normally dispense water at a relatively low rate (e.g., 1.0 to 1.5 gals/hr). A typical irrigation system may utilize several conduits of considerable length with many such spray devices spaced apart along them in order to irrigate a large area of plants or trees.

In general, the spray device 20 is comprised of an upper member 24 and a lower member 26 that are made separately and then assembled together before being attached to a conduit.

The upper member 24 has an enlarged, flat sided (e.g., hexagonal) head portion 28 with a central bore 30. Spaced above the head portion is a circular deflector 32 which is supported by a pair of spaced apart post members 34 that extend upwardly from the upper surface of the head portion at opposite sides of the central bore 30. Extending downwardly from the head portion is an integral lower sleeve portion 36 having external threads 38. The bore 30 also extends downwardly through this integral sleeve portion.

The bottom side of the deflector 32 has a conical surface 40 and formed on it is a plurality of radially extending grooves 42 that help to provide the desired spray pattern for the sprinkler device.

As shown in FIGS. 2 and 3, the lower member 26 has a cylindrical upper portion 44 with a diameter that enables it to form a sliding fit with the bore 30. Extending below this cylindrical portion is a lower conical or beveled portion 46 that provides a taper which enables the device to be easily inserted into a conduit. A central bore 48 in the lower member diverges near its upper end to a smaller diameter bore 50 thereby forming a nozzle to increase the water velocity just before it strikes the deflector.

In the bore 30 of the head portion of the upper member 24, is an annular, rounded bead portion 52 that projects radially inwardly to form a bore diameter essentially identical with that of the upper cylindrical portion 44 of the lower member. On the lower member, spaced a short distance from its upper end is a similar annular, rounded bead portion 54 whose diameter is essentially identical to that of the bore 30. For example, in a typical embodiment the bore 30 and the bead portion 54 may have a diameter of 0.187 inches, whereas the diameter of the cylindrical portion of the lower member and the inside diameter of the bead portion in the upper member may both be 0.180 inches.

Now, the conical or beveled portion 46 of the lower member has a maximum diameter substantially greater than the integral cylindical portion 44 and thus forms an annular shoulder 56 adjacent to its lower end. As shown in FIG. 2, when the lower member 26 is fully assembled with the upper member 24, the annular shoulder 56 is flush against the bottom edge of the threaded sleeve portion 36 of the upper member and, at this point, the annular bead 52 in the head portion of the upper member is directly below the annular bead 54 on the lower member. Thus, these two bead portions serve to hold the two members 24 and 26 together. Assembly of the two members 24 and 26 is accomplished merely by forcing the lower member into the bore 30 until the bead portion 54 passes over and forms a lock with the bead portion 52 in the bore 30.

As shown by FIGS. 5 and 6, the spray controlling grooves 42 on the deflector 32 of the device 20 are spaced from the tip of the conical surface and extend radially relative to it. These grooves are fairly deep (e.g., 0.011 inches) and are roughly triangular in cross section and thus well defined. Therefore, water projected from the divergent bore of the lower member will strike the apex of the conical surface and flow momentarily through the grooves 42, thereby being formed into separate radially directed streams. The embodiment as shown in FIGS. 1-6 will provide a spray pattern covering approximately 300° of arc, since approximately 30° is blanked out for each of the deflector supporting posts 28.

For irrigation applications where different arcs of spray coverage are desired, a modified upper member may be used in conjunction with the lower member 26. For example, in FIGS. 7-11 is shown an upper member 24a that is adapted to provide an arcuate coverage of 180°. In this embodiment, a deflector member 32a having a conical surface 40a covering approximately 200°, is supported on one side only by a post portion 58 extending upwardly from one side of the hexagonal head portion 28. A series of grooves 42a, similar to the grooves 42 of the first embodiment, extending radially and spaced from the apex of the conical surface provides the means for directing and breaking up the water stream through the lower member of the device into a fan shaped, approximately 180° spray pattern. In all other respects, the member 24a may be identical to the upper member 24.

Another modified form of upper member 24b for the device 20 is shown in FIGS. 12-15 and provides a full 360° spray pattern. Here, a deflector 32b, again having a conical shaped surface 40b on its bottom side, is held above the hexagonal head portion 28 by a series of circumferentially spaced apart posts 60. These posts, as shown in FIG. 15, have a triangular cross section and they are spaced apart so as to form circumferentially spaced apart and relatively narrow openings 62. Thus, in this embodiment, water from the divergent passage 50 of the lower member 26 strikes the apex of the conical surface 40b and is directed radially through the openings 62 to form a uniform 360° spray pattern.

Yet another form of top or upper member 24c for the device 20, is shown in FIGS. 16-18, and functions to provide approximately a 30° arc of coverage in opposite directions. In this embodiment, a deflector 32c is supported above the head portion 28 of this upper member by spaced apart post members 64 thereby forming a channel 66 between them. The deflector has a triangular shape in cross section, formed by two deflecting surfaces 68 that slope upwardly in opposite directions from a bottom edge 70. This latter edge is spaced directly above the divergent passage 50 in the lower member 26 of the device when assembled therewith. Thus, water striking the deflector 32c is directed essentially equally in opposite directions out the channel 66 of the device. In all other respects the upper member 24c is identical to the other upper members previously described.

All of the upper and lower members for the various forms of the device 20 are preferably made by injection molding of a suitable plastic material, such as polyvinyl chloride (PVC). Thus, in using a two piece assembly, it is possible to provide the necessary spray pattern forming grooves and/or channels and yet provide parts that can be produced on automated, high speed molding apparatus.

In operation, the device 20 in all its forms is easy to install, and once installed, it will not separate or come apart due to fluid pressure surges in the feeding conduit. Since the sleeve portion of each upper member is integral with the upper head portion and deflector and is threaded into the conduit, the deflector cannot be inadvertently separated from the device and the device itself will remain firmly in place within the conduit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A low pressure spray device adaptable for connection with a fluid conduit of an irrigation system, said device comprising:

an upper body member having an enlarged head portion with a central bore, a deflector member spaced above said upper body member supported by integral post means on said head portion and having a bottom surface aligned with said central bore, and an integral tubular lower portion extending below said head portion having external threads for securing said device within said conduit and a bore that is a continuation of said central bore;

a lower body member having a tubular upper portion with an outer cylindrical surface that fits within the bore of said upper body, and a lower end portion having a tapered surface, said lower body member having a central passage aligned with said bottom surface of said deflector member.

2. The spray device as described in claim 1 including interlocking means on said upper and lower body members for keeping them together when assembled.

3. The spray device as described in claim 2 wherein said interlocking means comprises an interior annular bead within said central bore of said head portion of said upper member and an exterior annular bead near the upper end of said lower member, said exterior bead being adjacent to an inside of said interior bead when said upper and lower members are assembled.

4. The spray device as described in claim 1 wherein said deflector member has a conical bottom surface with an apex aligned with the center of said central passage and a series of radially extending grooves on said surface, said post means comprising a pair of post members spaced 180° apart.

5. A spray device as described in claim 1 wherein said deflector member has a partial conical bottom surface with an apex aligned with the center of said central passage and a series of radially extending grooves on said conical surface, said deflector member being supported by a single post member extending upwardly from one side of said head portion.

6. The spray device as described in claim 5 wherein said radially extending grooves are spaced from said apex and cover an arc of at least 180° on said partial conical surface.

7. The spray device as described in claim 1 wherein said deflector member has a conical bottom surface with an apex aligned with the central passage of said lower member, and said post means comprises a plurality of circumferentially spaced apart post members arranged in a circular pattern around said central bore to interconnect said head portion and said deflector member and form equally spaced apart openings for a 360° spray pattern.

8. The spray device as described in claim 7 wherein said post members have a triangular cross section with sides that diverge outwardly.

9. The spray device as described in claim 1 wherein said deflector member has two upwardly sloping surfaces from an edge aligned with the central passage of said lower member, said post means comprising a pair of post members extending upwardly from opposite sides of said head portion and forming an open channel with said deflector member, whereby a relatively narrow spray pattern is emitted from opposite ends of said channel.

* * * * *